Oct. 6, 1925.

M. A. MARQUETTE 1,556,292

VULCANIZING STUD FOR TUBE MAKING

Filed Nov. 7, 1923

INVENTOR.
Melvon A. Marquette
BY
Edward C. Taylor
ATTORNEY.

Patented Oct. 6, 1925.

1,556,292

UNITED STATES PATENT OFFICE.

MELVON A. MARQUETTE, OF CHICOPEE FALLS, MASSACHUSETTS, ASSIGNOR TO THE FISK RUBBER COMPANY, OF CHICOPEE FALLS, MASSACHUSETTS, A CORPORATION OF MASSACHUSETTS.

VULCANIZING STUD FOR TUBE MAKING.

Application filed November 7, 1923. Serial No. 673,297.

*To all whom it may concern:*

Be it known that I, MELVON A. MARQUETTE, a citizen of the United States of America, residing at Chicopee Falls, in the county of Hampden and State of Massachusetts, have invented certain new and useful Improvements in Vulcanizing Studs for Tube Making, of which the following is a specification.

My invention relates to a vulcanizing stud for forming inner tubes for pneumatic tires, and is particularly concerned with the removing of the entrapped air and gas formed by a laminated valve pad during the process of vulcanization of the inner tube and valve pad.

Usually in making inner tubes, a calendered sheet of uncured rubber is laid on the table and a mandrel placed thereon parallel with one side and rolled over the sheet so as to ply it up into a tube, and then vulcanizing the rubber while so wrapped upon the mandrel. In order that the rubber tube may be reinforced at that portion through which the valve is later to be positioned in the tube it is necessary to provide the tube with a valve pad comprising a number of plies of woven fabric and of uncured rubber of successively varied size, these plies being superposed upon one another. This valve pad becomes incorporated with the tube during vulcanization and becomes a part thereof. According to the usual method of construction I have found many tubes spoiled during vulcanization upon the mandrel because of blowing or blistering of the rubber tube near the edge of the valve pad. This condition is partly due to entrapped air or gases caught between the several plies of stock forming the valve pad and partly due to moisture in the fabric plies of the pad. This moisture turns into vapor by the heat of vulcanization. While the rubber tube is in the process of vulcanization the entrapped air and vapor formed in the fabric plies of the valve pad are expanded by the heat and move to the edges of the pad laminations and frequently break through the rubber stock at one or more points thus causing the blistering and blowing I have referred to. According to my invention this result is avoided.

By means of my invention I build inner tubes free of blow holes or blisters, with the same ease as tubes have been built according to prior practice. The departure from the usual practice obviates a serious defect inherent in the former practice. My invention will be described with reference to the accompanying drawings; in which—

Figure 1:
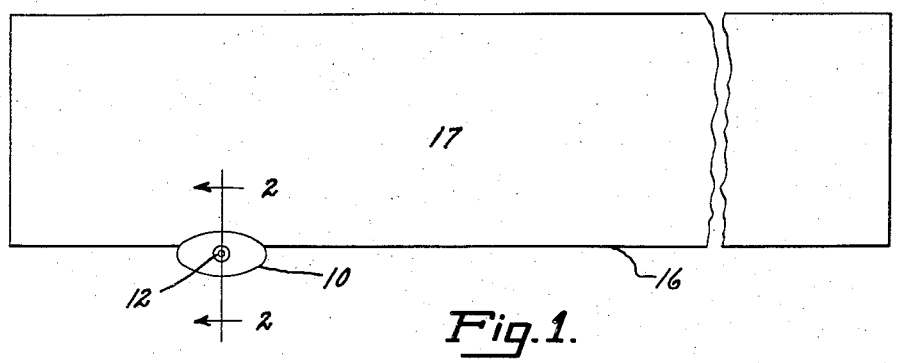
Fig. 1 shows a sheet of vulcanizable rubber composition with a laminated reinforcing valve pad in position to be rolled about a tube forming mandrel.
Figure 2:
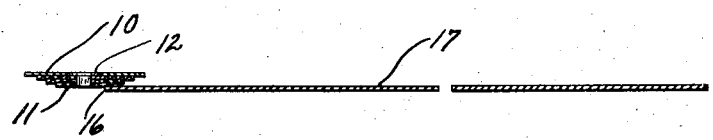
Fig. 2 is a cross-section taken on line 2—2 of Fig. 1 showing a detail of a valve pad or base with a building stud through the center.

The valve pad 10 shown in Figs. 1 and 2 has an opening 11 through it at approximately the center of the plies. The opening is of sufficient size and shape to permit the placing of the building stud 12 in it. This opening and stud may vary in size and shape as the purpose of the invention is to provide a space 13 inside the stud of sufficient capacity to contain all previously described gases and vapors expanded during the vulcanizing of the rubber tube and valve pad. The opening in the valve pad is preferably cut therein after the plies of fabric and uncured rubber have been superposed upon one another, as it gives an opening with the same diameter throughout the entire length of it.

Figure 5:
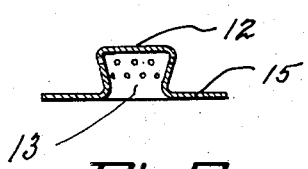
Fig. 5 is an enlarged cross-sectional view of the building stud or nipple.

The building stud 12 or nipple may be made of fiber or metal or other suitable material and the shape of it may be varied. For instance, it may be made in the shape of a hollow cylinder with one end closed having holes in the sides, but I prefer to use the type of building stud shown in Fig. 5 with a flanged portion 15. The flange 15 allows the stud to enter the opening in the valve pad only so far, and also may be used in removing the stud from the pad after the tube has been vulcanized.

Figure 3:
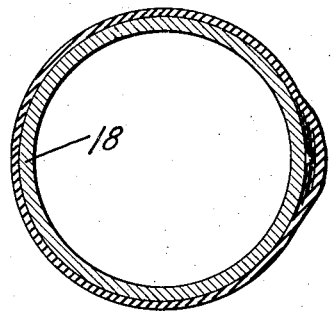
Fig. 3 is a cross-section taken through a tube forming mandrel and valve pad of a cured and finished tube.
Figure 4:
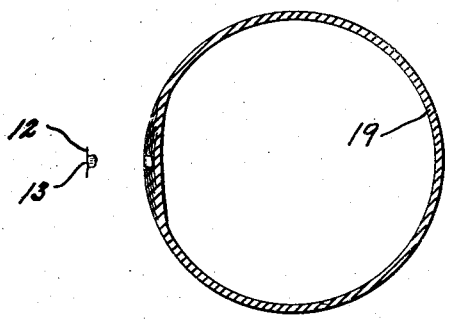
Fig. 4 is a cross-section, which illustrates a cured and finished tube after it has been removed from the mandrel, with the building stud removed.

The valve pad with the hollow building stud 12 is placed upon the sheet of rubber 17 near the edge 16 as shown in Figs. 1 and 2. The flange of the building stud faces away from the sheet as in Figs. 1, 2, and 3. The mandrel is placed parallel with the edge of the sheet which has the valve pad on it, and rolled over the sheet so as to ply it up on the mandrel. The stud 12 by this means has its open end closed by the mandrel, as in Fig. 3, so as to form the chamber or pocket I have described. The mandrel 18 is of the usual form and any part of its surface will cooperate to form the desired pocket. The mounted combination is next vulcanized upon the mandrel and the valve pad becomes incorporated in the rubber tube 19 during the vulcanization. The closed pocket will receive and hold the air, gas and vapor as the tube is being vulcanized.

When the tube is vulcanized it is peeled off the mandrel, the stud can be removed then or may be removed at any other time prior to punching the hole in the tube for the valve stem. The valve pad will then be on the outside, so as soon as the valve pad and stud peel away from the mandrel the gas and vapor in the hollow stud will escape into the atmosphere, through the open end of the stud.

Having thus described my invention, I claim:

A vulcanizing stud for use in tube making having a hollow body portion closed at one end and holes through the sides of the body portion.

MELVON A. MARQUETTE.